(12) United States Patent
Bäurle et al.

(10) Patent No.: US 9,537,405 B2
(45) Date of Patent: Jan. 3, 2017

(54) POWER CONVERTER WITH POWER FOLDBACK

(71) Applicant: Power Integrations, Inc., San Jose, CA (US)

(72) Inventors: Stefan Bäurle, San Jose, CA (US); David Michael Hugh Matthews, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 190 days.

(21) Appl. No.: 14/499,690

(22) Filed: Sep. 29, 2014

(65) Prior Publication Data

US 2016/0094131 A1 Mar. 31, 2016

(51) Int. Cl.
*H02M 3/335* (2006.01)
*H02M 1/32* (2007.01)

(52) U.S. Cl.
CPC ........... *H02M 3/33507* (2013.01); *H02M 1/32* (2013.01); *H02M 3/33576* (2013.01); *H02M 2001/327* (2013.01)

(58) Field of Classification Search
CPC .... H02M 3/33507; H02M 1/32; H02M 3/156; H02M 3/33515; H02M 3/33523; H02M 3/33561; G05F 1/565
See application file for complete search history.

(56) References Cited

U.S. PATENT DOCUMENTS

| 6,078,511 A * | 6/2000 | Fasullo | H02H 5/042 363/50 |
|---|---|---|---|
| 7,746,673 B2 * | 6/2010 | Grant | H02M 3/33515 363/21.12 |
| 8,040,699 B2 * | 10/2011 | Huynh | H02M 3/33523 361/18 |
| 2010/0194445 A1 * | 8/2010 | Balakrishnan | H02M 3/33507 327/108 |
| 2011/0101778 A1 * | 5/2011 | Yang | H02J 7/0068 307/52 |
| 2011/0194315 A1 * | 8/2011 | Gaknoki | H02M 3/33507 363/21.17 |

* cited by examiner

*Primary Examiner* — Adolf Berhane
*Assistant Examiner* — Henry Lee, III
(74) *Attorney, Agent, or Firm* — Blakely Sokoloff Taylor & Zafman LLP

(57) ABSTRACT

A controller for use in a power converter includes a drive circuit coupled to control switching of a power switch of the power converter to regulate the output of the power converter. A limit sense circuit is coupled to output a limit sense signal in response to a condition of the power converter. The drive circuit is coupled to operate in a first operation mode if there is a no limit condition. The first operation mode includes regulating the output of the power converter with a regulated output voltage and a first maximum output current. The drive circuit is coupled to operate in a second operation mode if there is a limit condition. The second operation mode regulating the output of the power converter with the regulated output voltage and a second maximum output current wherein the second maximum output current is less than the first maximum output current.

23 Claims, 6 Drawing Sheets

POWER CONVERTER WITH POWER FOLDBACK

BACKGROUND INFORMATION

Field of the Disclosure

The present invention relates generally to power converters, and more specifically to power converters utilized to charge powered devices.

Background

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is utilized to provide the desired output by varying the duty cycle (typically the ratio of the ON time of the switch to the total switching period), varying the switching frequency, or varying the number of pulses per unit time of the switch in a switched mode power converter.

Power may be provided to electronic devices, which may also be referred to as powered devices, through a cable, such as a Universal Serial Bus (USB) cable. The powered device may be powered and/or charged through a charging device, which may include the switched mode power converter. The powered device typically includes a rechargeable battery, and the switched mode power converter typically charges the battery in addition to providing power to operate the powered device. Typically, a cable connects to the charging device and the powered device utilizing a plug interface. Each end of the cable may have a plug that connects to a respective socket of the charging device or the powered device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
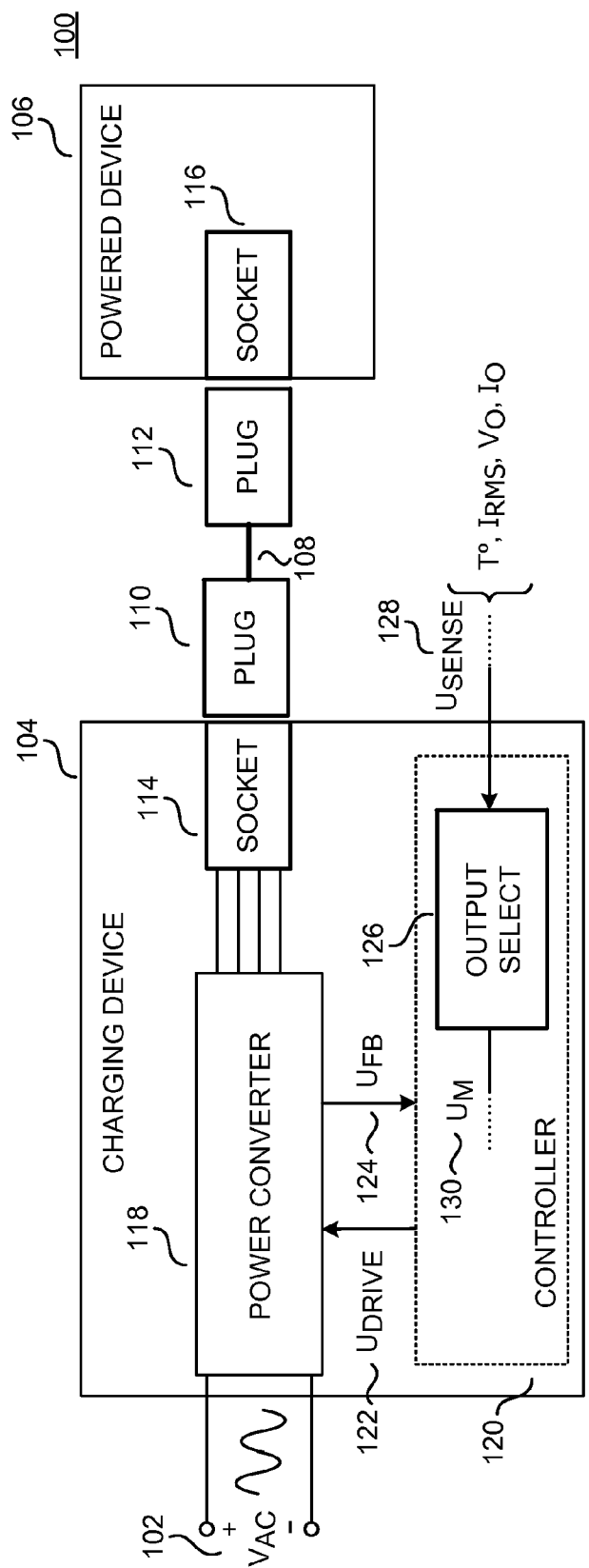
FIG. 1 is a functional block diagram illustrating an example charging device coupled to a power device through a cable in accordance with teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale. For illustrative purposes the below description discusses a power converter used to provide output voltage and current to for the purposes of providing energy to a battery powered product. It is appreciated however that the present invention may be applied in general to any power converter. As mentioned above, a charging device (such as a switched mode power converter) may charge and/or power a powered device from a wall socket through a cable, such as a USB cable. However the ac input voltage provided through the wall socket may vary in frequency and magnitude depending on the region. For example, the nominal range of the ac input voltage is between 100-240 VAC with an approximate +/−10% tolerance. As such, the range of the ac input voltage may vary between 90-264 VAC. The power converter input root mean square (RMS) current may increase as the input voltage to the charging device (such as a switched mode power converter) decreases causing the rectified average high-voltage dc bus voltage to decrease as well. In general, overall dissipation of switched mode power converters is highest when the input RMS current is at its highest value, which may lead to higher component or overall power converter temperatures. As such, switched mode power converters may be designed for scenarios with the highest input RMS current that may occur when the ac input voltage is outside of the nominal range, which may result in larger high-voltage input capacitors, silicon switches, heat sinks, and magnetics than if the power converter were designed for scenarios with lower input RMS current within the nominal range of the ac input voltage. Larger components generally increase the cost and size of the power converter. A condition in which the input RMS current is high may be referred to as a limit condition.

The limit condition in which the RMS current is high may be sensed by sensing the input RMS current, temperature of various components of the power converter, or through the output voltage or output current of the power converter. For example, the limit condition may be sensed when the temperature of various components of the power converter is high. In another example, the limit condition may be sensed when the power converter is unable to provide a regulated output voltage before the rated output current of the power converter is reached. Or in other words, when the output voltage of the power converter decreases before the output current has reached its rated value.

When the limit condition is sensed, the power converter may operate in a different mode. The power converter may change its operating mode by changing the output voltage, output current, or output power provided by the power converter (e.g., charging device). For example, the power converter may decrease the provided output voltage, output current, or output power when the limit condition is sensed. Once the power converter is no longer in a limit condition, the power converter may return to its normal operating mode. In one example, returning to its normal operating mode may include increasing the provided output voltage, output current, or output power.

To illustrate, FIG. 1 shows an example of a charging system 100 including a charging device 104 coupled to a powered device 106 through a cable 108 in accordance with the teachings of the present invention. Plugs 110 and 112 are disposed at each end of the cable 108. Charging device 104 and the powered device 106 include sockets 114 and 116, respectively. As illustrated, charging device 104 also includes power converter 118 and the controller 120. Controller 120 further includes output select circuit 126. Further illustrated in FIG. 1A are an ac input voltage $V_{AC}$ 102, a drive signal $U_{DRIVE}$ 122, a feedback signal $U_{FB}$ 124, and a sense signal $U_{SENSE}$ 128 and a mode signal $U_M$ 130.

Charging device 104 is coupled to deliver power to the powered device 106 through the cable 108. As illustrated, the charging device 104 and the powered device 106 interface with the cable 108 through sockets 114, 116, and plugs 110, 112. In one example, the socket/plug interface may adhere to socket/plug standards such as for example, but not limited to, USB, micro-USB, etc. It should be appreciated that the socket/plug interface for the charging device 104 need not be the same as the socket/plug interface for the powered device 106. For example, the socket 114 and plug 110 for the charging device 104 may adhere to the USB pinout standard while the socket 116 and plug 112 for the powered device 106 may adhere to the mini-USB or micro-USB standard. The socket 114 and plug 110 may include terminals for providing power, for providing a return path to ground, and for communicating data.

As shown in the example depicted in FIG. 1, charging device 104 includes the power converter 118, which is coupled to receive ac input voltage $V_{AC}$ 102, and provides a regulated output to the socket 114. The regulated output is then delivered to the powered device 106 when the powered device 106 is connected via cable 108 to charging device 104. The power converter 118 may also provide the feedback signal $U_{FB}$ 124 and receive the drive signal $U_{DRIVE}$ 122 from the controller 120. Controller 120 may provide the drive signal $U_{DRIVE}$ 122 to control operating conditions of the power converter 118 to regulate the output in response to the feedback signal $U_{FB}$ 124. For example, the controller 120 may vary the duty cycle (typically the ratio of the ON time of the switch to the total switching period), switching frequency, the number of pulses per unit time of the switch in the power converter 118. The controller 120 further includes output select circuit 126, which is coupled to receive the sense signal $U_{SENSE}$ 128 and output the mode signal $U_M$ 130. For one example, the output select circuit 126 determines when the power converter 118 is in a limit condition from the sense signal $U_{SENSE}$ 128. As illustrated, the sense signal $U_{SENSE}$ 128 may be representative of at least one of temperature, RMS current, output voltage, or output current of the power converter. In one example, the sensed temperature may be the temperature of one or more components of the power converter or the ambient temperature inside the enclosure, which houses the power converter. In other words, the sense signal $U_{SENSE}$ 128 may be representative of one or more components that may relay whether the power converter is in a limit condition. Or further, the sense signal $U_{SENSE}$ 128 may be representative of one or more components that may relay whether the power converter is unable to provide a regulated output. The output select circuit 126 outputs the mode signal $U_M$ 130 in response to the sense signal $U_{SENSE}$ 128. The mode signal $U_M$ 130 may be representative of the operating mode which the controller 120 may control the power converter 118 through the drive signal $U_{DRIVE}$ 122. In other words, the drive signal $U_{DRIVE}$ 122 is output in response to the mode signal $U_M$ 130.

The operating mode of the controller 120 may determine the output voltage, output current, or the output power of the power converter 118. For example, the sense signal $U_{SENSE}$ 128 may be representative of temperature of one or more components of the power converter 118. When the temperature is greater than a threshold, the output select circuit 126 determines that the power converter 118 is in a limit condition and the controller 120 controls the power converter 118 to reduce its output power in response to the mode signal $U_M$ 130. In another example, the sense signal $U_{SENSE}$ 128 may be representative of the output voltage and output current of the power converter 118. When the output voltage decreases while the output current is less than the maximum rated output current of the power converter 118, the controller 120 may control the power converter 118 to reduce its output power in accordance with the teachings of the present invention.

Figure 2:
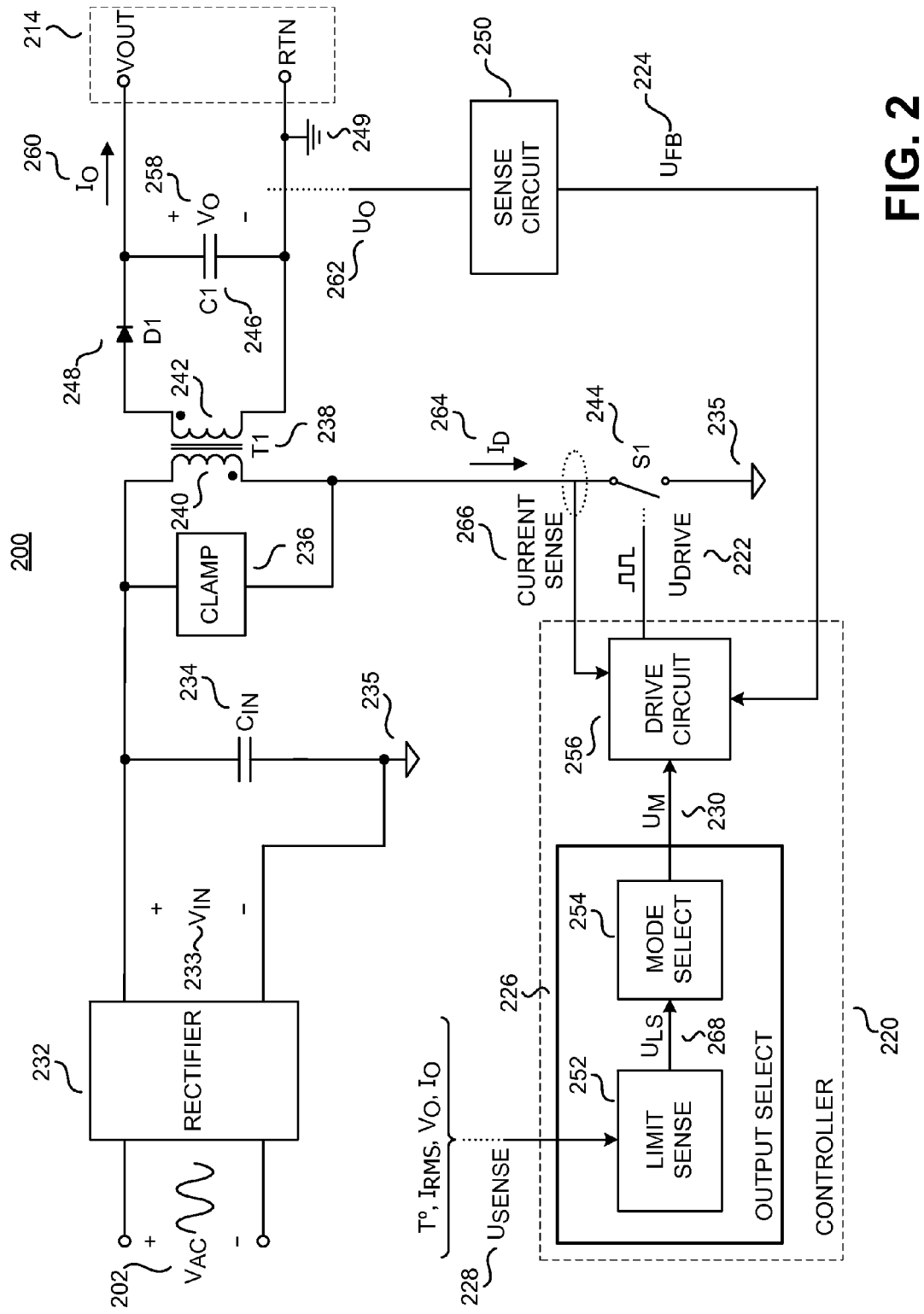
FIG. 2 is a diagram illustrating an example of a switched mode power converter utilized in an example of a charging device in accordance with teachings of the present invention.

FIG. 2 is a diagram illustrating an example of a switched mode power converter and controller 220 utilized in an example of a charging device 200 in accordance with the teachings of the present invention. As shown in the depicted example, charging device 200 receives the ac input voltage $V_{AC}$ 202 and the charging device 200 includes power converter, socket 214, controller 220, drive signal $U_{DRIVE}$ 222, feedback signal $U_{FB}$ 224, output select circuit 226, sense signal $U_{SENSE}$ 228, and mode signal $U_M$ 230. It is appreciated that charging device 200 may be one example of charging device 104 illustrated in FIG. 1A, and that similarly named elements referenced below are coupled and function similar to as described above. As shown in the depicted example, the switched mode power converter further includes a rectifier 232, an input capacitor $C_{IN}$ 234, an input return 235, a clamp circuit 236, an energy transfer element T1 238, a primary winding 240 of the energy transfer element T1 238, a secondary winding 242 of the energy transfer element T1 238, a power switch S1 244, an output capacitor C1 246, an output rectifier D1 248, output return 249, and a sense circuit 250. The socket 214 includes the output terminal VOUT and return terminal RTN. Controller 220 includes the output select circuit 226 and the drive circuit 256. Output select circuit 226 includes limit sense circuit 252 and mode select circuit 254. Further illustrated in FIG. 2 are the input voltage $V_{IN}$ 233, output voltage $V_O$ 258, output current $I_O$ 260, output quantity $U_O$ 262, switch current $I_D$ 264, switch current sense signal 266, and a limit sense signal $U_{LS}$ 268. It is noted that the example switched mode power converter shown in FIG. 2 is coupled in a flyback configuration. It is appreciated that other known topologies (such as buck, buck-boost, forward, and LLC converters) and configurations may benefit from the teachings of the present invention. In addition, the power converter illustrated is an isolated power converter. It should be appreciated that non-isolated power converters may also be used in accordance with the teachings of the present invention.

In the depicted example, the power converter provides output power from an unregulated input voltage, such as ac input voltage $V_{AC}$ 202. The rectifier 232 is coupled to receive and rectify the ac input voltage $V_{AC}$ 202 and outputs the input voltage $V_{IN}$ 233. The rectifier 232 further couples to the energy transfer element T1 238. In some examples, the energy transfer element T1 238 may be a transformer, or an inductor. The example energy transfer element T1 238 shown includes two windings, a primary winding 240 and a secondary winding 242. However, in other examples, it is appreciated that the energy transfer element T1 238 may have more than two windings. The power converter utilizes the energy transfer element T1 238 to transfer energy between the primary winding 240 and the secondary winding 242. The primary winding 240 is coupled to the power switch S1 244 and the switch S1 244 is further coupled to input return 235.

In addition, the clamp circuit 236 is illustrated as coupled across the primary winding 240 to limit the maximum voltage on the power switch S1 244. The input capacitor $C_{IN}$ 234 may be coupled across both the primary winding 240 and power switch S1 244 and filters the high frequency current from the power switch S1 244. Secondary winding 242 is coupled to the output rectifier D1 248, which is exemplified as a diode. However, the output rectifier D1 248 may be a transistor used as a synchronous rectifier. Output capacitor C1 246 is shown as being coupled to the output rectifier D1 248 and the output return 249. The power converter further includes circuitry to regulate the output, which is exemplified as output quantity $U_O$ 262. In general, the output quantity $U_O$ 262 is representative of an output voltage $V_O$ 258, an output current $I_O$ 260, or a combination of the two. A sense circuit 250 is coupled to sense the output quantity $U_O$ 262 and to provide feedback signal $U_{FB}$ 224, which is representative of the output quantity $U_O$ 262.

As shown, controller 220 is coupled to receive the feedback signal $U_{FB}$ 224. The controller 220 further includes terminals for receiving the sense signal $U_{SENSE}$ 228, switch current sense signal 266, and for providing the drive signal $U_{DRIVE}$ 222 to the power switch S1 244. The switch current sense signal 266 may be representative of the switch current $I_D$ 264 in the power switch S1 244. In the example of FIG. 2, the sense signal $U_{SENSE}$ 228 may be representative of one or more conditions of the power converter, which may relay when the power converter is in a limit condition. Examples of such conditions could be the temperature of various components, such as the energy transfer element T1 238 or the output rectifier D1 248, RMS current, the output voltage $V_O$ 258, or the output current $I_O$ 260. In another example, the limit condition could be the ambient temperature inside the enclosure of a sealed charging device. The sense signal $U_{SENSE}$ 228 may be a voltage signal or a current signal. In addition, the controller 220 provides drive signal $U_{DRIVE}$ 222 to the power switch S1 244 to control various switching parameters to control the transfer of energy from the input of power converter to the output of power converter. Examples of such parameters may include switching frequency (or period), duty cycle, ON and OFF times of the power switch S1 244, or varying the number of pulses per unit time of the power switch S1 244.

Switch S1 244 is opened and closed in response to the drive signal $U_{DRIVE}$ 222. In operation, the switching of the power switch S1 244 produces a pulsating current at the output rectifier D1 248. The current is filtered by the output capacitor C1 246 to produce a substantially constant output voltage $V_O$ 258, output current $I_O$ 260, or a combination of the two. In one example, the power switch S1 244 may be a transistor such as a metal-oxide-semiconductor field-effect transistor (MOSFET). In another example, controller 220 may be implemented as a monolithic integrated circuit or may be implemented with discrete electrical components or a combination of discrete and integrated components. Controller 220 and switch S1 244 could form part of an integrated circuit that is manufactured as either a hybrid or monolithic integrated circuit.

Controller 220 is shown as including the output select circuit 226 and the drive circuit 256. Further, the output select circuit 226 includes the limit sense circuit 252 and the mode select circuit 254. Limit sense circuit 252 is coupled to receive the sense signal $U_{SENSE}$ 228 and output the limit sense signal $U_{LS}$ 268. The limit sense circuit 252 determines whether the power converter is in the limit condition in response to the sense signal $U_{SENSE}$ 228. The limit sense signal $U_{LS}$ 268 may be a voltage signal or a current signal and is representative of whether the power converter is in a limit condition. Mode select circuit 254 is coupled to receive the limit sense signal $U_{LS}$ 268 and select the operating mode of the controller 220 and the power converter. The mode select circuit 254 outputs the mode signal $U_M$ 230, which may be a voltage signal or a current signal and is representative of the operating mode of the controller 220 and power converter, to the drive circuit 256. Drive circuit 256 is coupled to receive the mode signal $U_M$ 230. In the example shown, the drive circuit 256 may also receive the switch current sense signal 266 and the feedback signal $U_{FB}$ 224. The drive circuit 256 may output the drive signal $U_{DRIVE}$ 222 in response to the mode signal $U_M$ 230 and the feedback signal $U_{FB}$ 224. When the limit condition is not sensed by the limit sense circuit 252, the mode select circuit 254 may select one operating mode. Once the limit condition is sensed, the mode select circuit 254 may select another operating mode. The selected operating mode is provided to the drive circuit 256 via the mode signal $U_M$ 230.

Figure 3A:
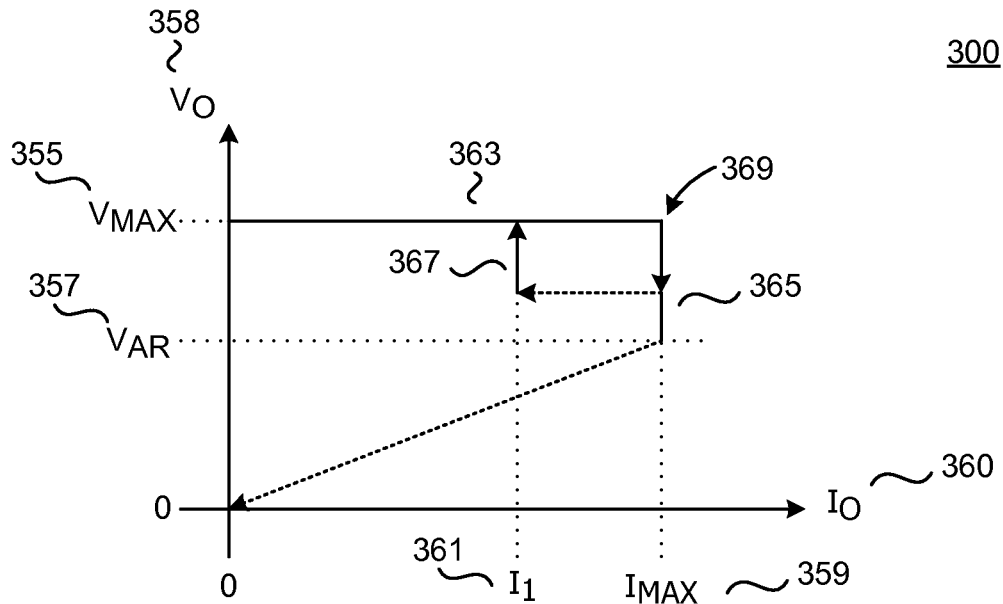
FIG. 3A is a graph illustrating example operating regions of an output voltage and output current of a switched mode power converter in accordance with teachings of the present invention.
Figure 6:
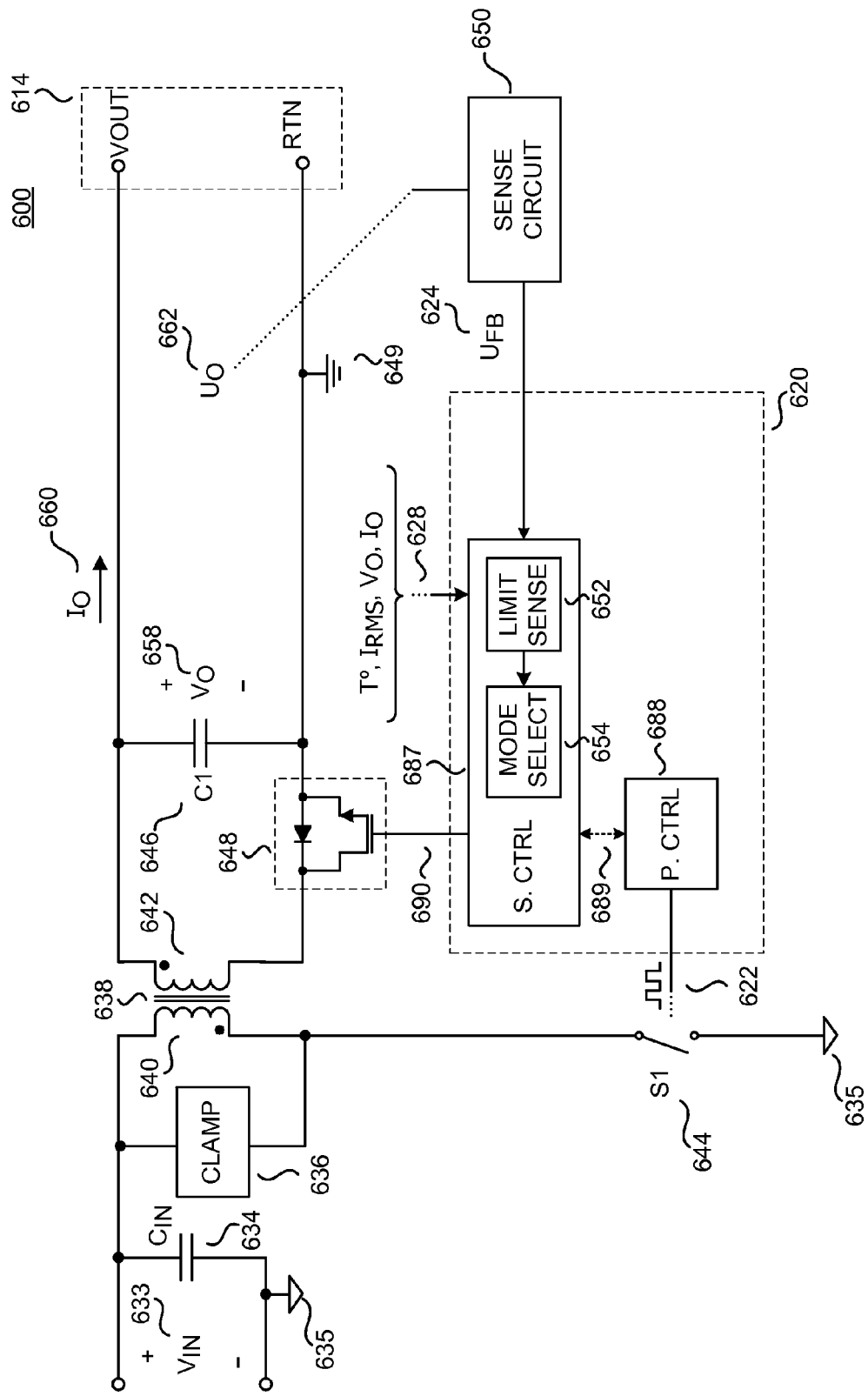
FIG. 6 is a diagram illustrating another example of a switched mode power converter utilized in an example of a charging device in accordance with teachings of the present invention.

FIG. 3A is a graph 300 illustrating example operating regions of an output voltage $V_O$ 358 and output current $I_O$ 360 of an example power converter, such as the power converter illustrated in FIG. 2 or FIG. 6. Region 363 may be referred to as the constant voltage (CV) region. In the CV region 363, the output voltage $V_O$ 358 is substantially equal to the maximum rated voltage $V_{MAX}$ 355 while the output current $I_O$ 360 may vary. As shown, the output current $I_O$ 360 may vary from substantially zero to the maximum rated current $I_{MAX}$ 359. Apex 369 represents the maximum output power of the power converter as the output voltage $V_O$ 358 is substantially equal to the maximum rated voltage $V_{MAX}$ 355 while the output current $I_O$ 360 is substantially equal to the maximum rated current $I_{MAX}$ 359.

Region 365 may be referred to as the constant current (CC) region. In the CC region 365, the output current $I_O$ 360 is substantially equal to the maximum rated current $I_{MAX}$ 359 while the output voltage $V_O$ 358 may vary. If the output voltage $V_O$ 358 drops below the threshold $V_{AR}$ 357, the controller may control the power converter such that output voltage $V_O$ and the output current $I_O$ 360 are substantially equal to zero (as shown by the dotted line towards zero). This may be representative of the controller entering a fault mode, such as auto-restart or hiccup mode. When the power converter is in a limit condition, the controller may operate in region 367. As illustrated, the output current $I_O$ 360 is reduced to substantially equal the first current $I_1$ 361 and the output voltage $V_O$ 358 may vary. In one example, the controller may operate in region 367 in response to the sense signal $U_{SENSE}$ 328.

Figure 3B:
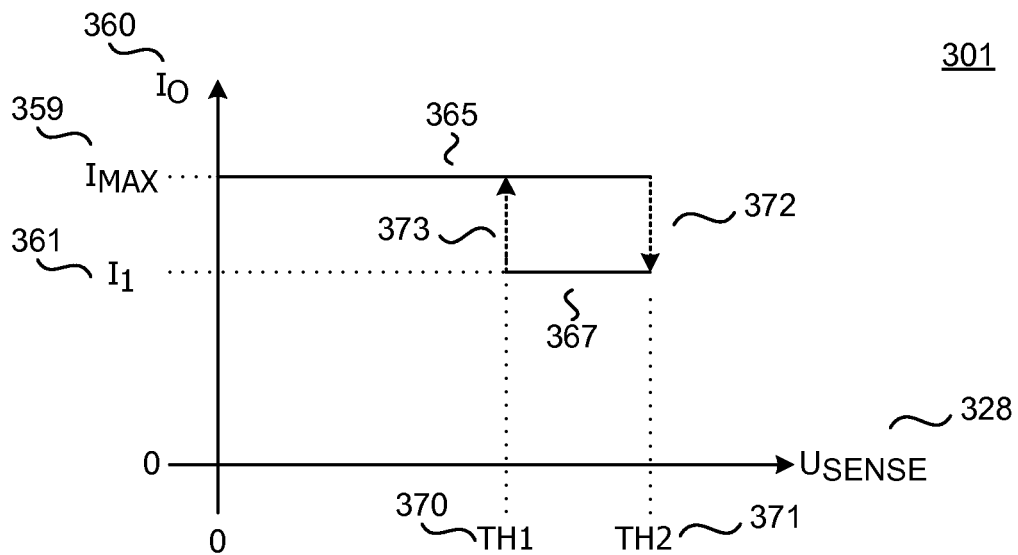
FIG. 3B is a graph illustrating further example operating regions of output current in response to a sense signal of an output select circuit utilized in an example power converter in accordance with teachings of the present invention.

FIG. 3B is a graph 301 illustrating further example operating regions (or modes) of output current $I_O$ 360 in response to a sense signal $U_{SENSE}$ 328. When the power converter is not in a limit condition, the controller may operate in region 365. As shown, in region 365 the output current $I_O$ 360 is substantially equal to the maximum rated current $I_{MAX}$ 359 for values of the sense signal $U_{SENSE}$ 328 between zero and the second threshold TH2 371. In other words, when the power converter is not in the limit condition, the power converter may regulate its output with the regulated output voltage and up to the maximum rated current $I_{MAX}$ 359. However, if the sense signal $U_{SENSE}$ 328 reaches the second threshold TH2 371, the controller transitions to operating region 367 (as illustrated by dashed line 372). In operating region 367, the output current $I_O$ 360 is substantially equal to the first current $I_1$ 361 between the first threshold TH1 370 and the second threshold TH2 371. In other words, when the power converter is in a limit condition, the power converter may regulate its output to the regulated output voltage and up to the first current $I_1$ 361. As shown, the value of the first threshold TH1 370 is less than the value of the second threshold TH2 371. In addition, the value of the maximum rated current $I_{MAX}$ 359 is greater than the value of the first current $I_1$ 361 (or also referred to as a second maximum current). If the sense signal $U_{SENSE}$ 328 reaches the first threshold TH1 370, the controller transitions to operating region 365 (as illustrated by the dashed line 373). Although only two current thresholds and two sense signal thresholds are shown, it should be appreciated that any number of current and sense signal thresholds may be utilized.

In one example, the sense signal $U_{SENSE}$ 328 may represent the temperature of one or more components of the power converter, such as the energy transfer element or output rectifier. In general, hotter temperatures may indicate an increase in RMS current and the power converter may be in a limit condition. If the temperature increases such that it reaches the second threshold TH2 371 (indicating the power converter is in a limit condition and/or may be unable to regulate the output), the output current $I_O$ 360 is reduced to the first current $I_1$ 361. If the temperature decreases such that it reaches the first threshold TH1 370 (indicating that the power converter is not in a limit condition), the output current $I_O$ 360 is increased to the maximum current $I_{MAX}$ 359. By decreasing the output current $I_O$ 360 (and as such the output power) when the power converter is in a limit condition may provide potential cost savings for the power converter. For example, the power converter may utilize smaller high-voltage input capacitors, silicon switches, heat sinks, and magnetics compared to when the power converter is designed for the limit condition.

Figure 4:
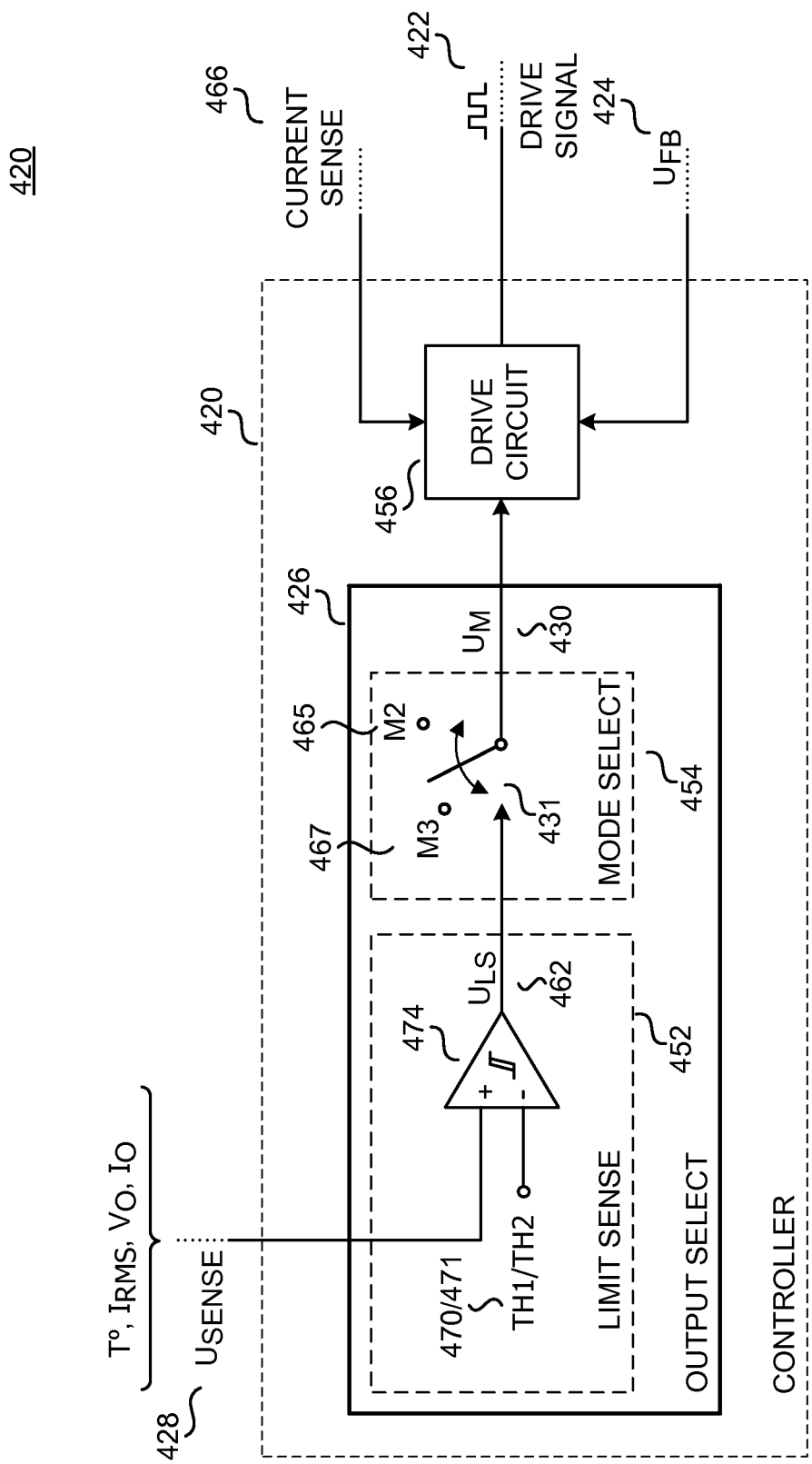
FIG. 4 is a diagram illustrating an example controller of a power converter in accordance with teachings of the present invention.

FIG. 4 is a diagram illustrating an example controller 420 utilized in an example of a charging device in accordance with teachings of the present invention. As shown, the controller 420 includes the output select circuit 426, drive circuit 456, limit sense circuit 452, mode select circuit 454, a hysteretic comparator 474, and a switch 431. Further illustrated in FIG. 4 are drive signal 422, feedback signal $U_{FB}$ 424, sense signal $U_{SENSE}$ 428, mode signal $U_M$ 430, switch current sense signal 466, limit sense signal $U_{LS}$ 462, first threshold TH1 470, second threshold TH2 471, operation mode M2 465 and operation mode M3 467.

Limit sense circuit 452 includes the hysteretic comparator 474 which is coupled to receive the sense signal $U_{SENSE}$ 428 and the first threshold TH1 470 or second threshold TH2 471. As shown in FIG. 4, the sense signal $U_{SENSE}$ 428 is received at the non-inverting input of the hysteretic comparator 474 while the first threshold TH1 470 and second threshold TH2 471 are received at the inverting input of hysteretic comparator 474. The output of the hysteretic comparator 474 is the limit sense signal $U_{LS}$ 462. The limit sense signal $U_{LS}$ 462 may be a rectangular waveform with varying lengths of logic high and logic low sections. In one example, the limit sense signal $U_{LS}$ 462 transitions to a logic high value when the sense signal $U_{SENSE}$ 428 reaches the second threshold TH2 471. The limit sense signal $U_{LS}$ 462 transitions back to a logic low value when the sense signal $U_{SENSE}$ 428 reaches the first threshold TH1 470. In other words, the limit sense signal $U_{LS}$ 462 may be in one state (i.e., logic high) indicating that the power converter is in a limit condition or in another state (i.e., logic low) indicating that the power converter is not in a limit condition (or vice versa).

Mode select circuit 454 may include the switch 431. One terminal of the switch is coupled to receive the operation mode M2 465 while the other terminal of the switch is coupled to receive the operation mode M3 467. Limit sense signal $U_{LS}$ 462 controls switching of the switch 431. In one example, when the limit sense signal $U_{LS}$ 462 indicates that the limit condition was not detected, the switch is controlled such that the mode signal $U_M$ 430 is representative of operation mode M2 465. If the limit sense signal $U_{LS}$ 462 indicates that the limit condition was detected, the switch is controlled such that the mode signal $U_M$ 430 is representative of operation mode M3 467. The mode signal $U_M$ 430 is then received by the drive circuit 456. For example, the mode signal $U_M$ 430 may indicate that the controller 420 should operate in the operation region 365 or the operation region 367 (as shown in FIGS. 3A and 3B). Regulation may be accomplished by comparing the feedback signal $U_{FB}$ 424 with a threshold value. In one example, the different operating modes/region may set the threshold value, which the feedback signal $U_{FB}$ 424 may be compared to.

Figure 5A:
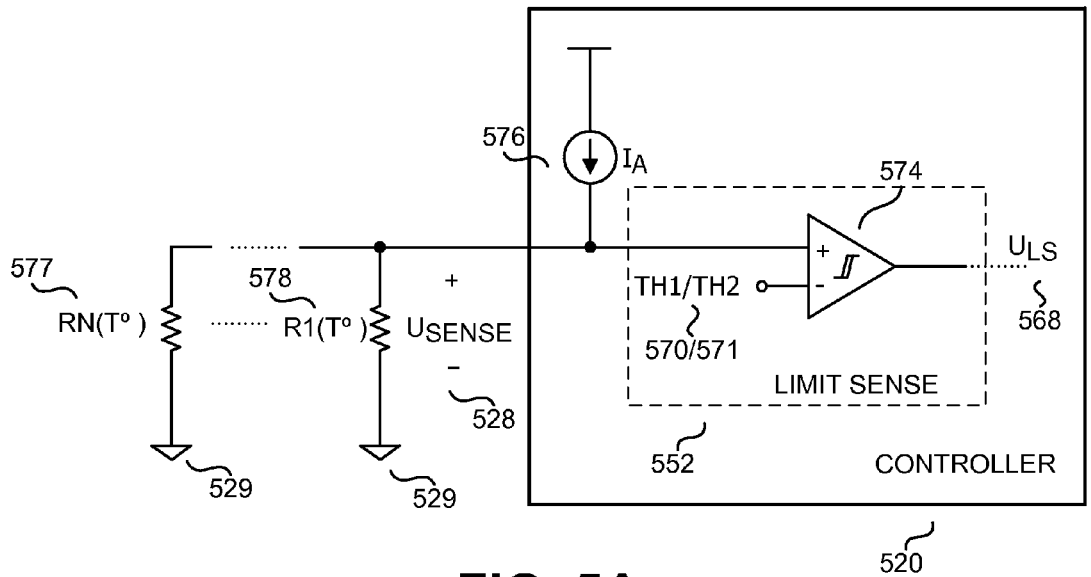
FIG. 5A is a diagram illustrating an example limit sense circuit of a power converter controller in accordance with teachings of the present invention.

FIG. 5A is a diagram illustrating an example limit sense circuit 552 and how the sense signal $U_{SENSE}$ 528 may be generated. In particular, FIG. 5A illustrates a sense signal $U_{SENSE}$ 528 representative of temperature. As shown, the limit sense circuit 552 is shown including the hysteretic comparator 574. Further illustrated are limit sense signal U$_{LS}$ 568, first threshold TH1 570, second threshold TH2 571, temperature sensing elements R1 578 and RN 577, and current source 576 with current I$_A$. While FIG. 5A illustrates two temperature sensing elements, it should be appreciated that one or more temperature sensing elements may be utilized.

Temperature sensing elements R1 578 and RN 577 are coupled together in parallel and the voltage across the temperature sensing elements R1 578 and RN 577 is the sense signal U$_{SENSE}$ 528. One end of temperature sensing elements R1 578 and RN 577 are coupled to the limit sense circuit 552. The other end of temperature sensing elements R1 578 and RN 577 are coupled to return 529. In the example shown, the temperature sensing elements R1 578 and RN 577 are coupled to the non-inverting input of hysteretic comparator 574. Current source 576 is also coupled to the non-inverting input of the hysteretic comparator 574. Similar to what was discussed above, the inverting input of the hysteretic comparator is coupled to receive the first threshold TH1 570 or the second threshold TH2 571 while the output of the hysteretic comparator 574 is the limit sense signal U$_{LS}$ 568.

Temperature sensing elements R1 578 and RN 577 may be positive temperature coefficient (PTC) thermistors or negative temperature coefficient (NTC) thermistors may also be used. The resistance of a PTC thermistor increases as the temperature increases while the resistance of a NTC thermistor decreases as the temperature increases. The temperature sensing elements R1 578 and RN 577 shown in FIG. 5A are PTC thermistors. However, if NTC resistors were to be used, the inputs to the hysteretic comparator may be flipped. For example, the temperature sensing elements R1 578 and RN 577 and the current source 576 may be coupled to the inverting input while the non-inverting input may be coupled to receive the first and second thresholds TH1 570 or TH2 571.

The temperature sensing elements R1 578 and RN 577 may be placed approximate to one or more components within the power converter. In general, the temperature within the power converter increases as the RMS current increases (and average input voltage decreases) or as the ambient temperature increases. As such, temperature may be utilized as an indicator of a limit condition of the power converter. In particular, the temperature sensing elements may be thermally coupled to components, such as the energy transfer element or the output rectifier, which are susceptible to temperature changes due to RMS current. In addition, the temperature sensing elements R1 578 and RN 577 are illustrated as external to the controller 520.

In operation, current I$_A$ from current source 576 generates a voltage across the temperature sensing elements R1 578 and RN 577. The voltage may be the sense signal U$_{SENSE}$ 528. When the temperature is lower, the resistances of the temperature sensing elements R1 578 and RN 577 are lower and the voltage across the temperature sensing elements R1 578 and RN 577 is lower. If the temperature is low enough that the voltage across the temperature sensing elements R1 578 and RN 577 is less than the second threshold TH2 571, the limit sense signal U$_{LS}$ 568 is logic low. However, if the temperature increases such that the voltage across the temperature sensing elements R1 578 and RN 577 is greater than the second threshold TH2 571, the limit sense signal U$_{LS}$ 568 is logic high. The limit sense signal U$_{LS}$ 568 does not transition back to a logic low value until the voltage across the temperature sensing elements R1 578 and RN 577 falls below the first threshold TH1 570.

Figure 5B:
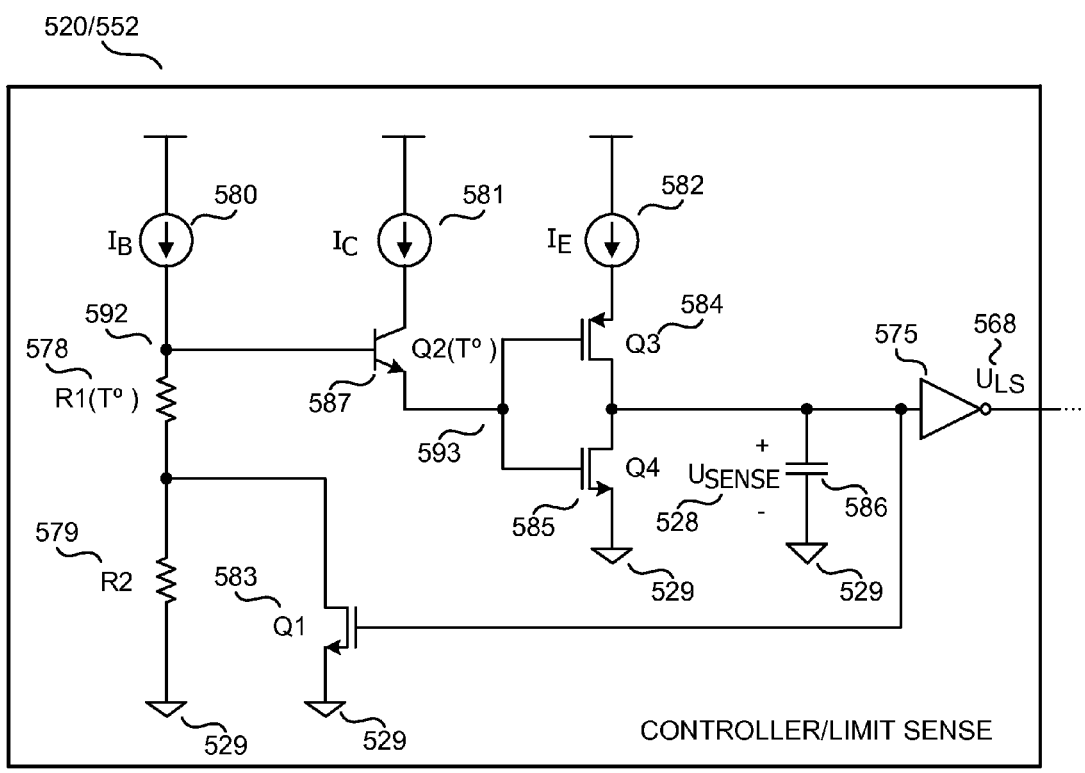
FIG. 5B is a diagram illustrating another example limit sense circuit of a power converter controller in accordance with teachings of the present invention

FIG. 5B is a diagram illustrating another example limit sense circuit 552 and how the sense signal U$_{SENSE}$ 528 may be generated. FIG. 5B also illustrates a sense signal U$_{SENSE}$ 528 representative of temperature. In the depicted example, the temperature sensing elements R1 578 and Q2 587 are internal to the controller 520. The controller 520 and the limit sense circuit 552 are shown as including inverter 575, temperature sensing element R1 578 (exemplified as a PTC thermistor), a temperature sensing element Q2 587 (exemplified as a transistor), resistance R2 579, current sources 580, 581, 582 with currents I$_B$, I$_C$, I$_E$, respectively, and transistors Q1 583, Q3 584, and Q4 585. Further illustrated in FIG. 5B are the sense signal U$_{SENSE}$ 528 and the limit sense signal U$_{LS}$ 568.

Resistance R1 578 (also referred to as a temperature sensing element) is coupled to the current source 580 and resistance R2 579. Transistor Q1 583, exemplified as an n-type metal oxide semiconductor field effect transistor (MOSFET), is coupled across the resistance R2 579. In other words, one end of transistor Q1 583 is coupled to a node between resistance R1 578 and R2 579, while the other end of transistor Q1 583 is coupled to return 529. Both the resistance R1 578 and the current source 580 are coupled to the transistor Q2 587 (also referred to as a temperature sensing element). In particular, the transistor Q2 587 is exemplified as a npn bipolar junction transistor (BJT) and the resistance R1 578 is coupled to the base terminal of the transistor Q2 587 (labeled terminal 592). For the example illustrated, the base-emitter voltage of the transistor Q2 587 varies with temperature. The base-emitter voltage decreases as the temperature increases. The current source 581 is shown as coupled to the collector terminal of transistor Q2 587.

Transistor Q2 587 is further coupled to transistors Q3 584 and Q4 585. As illustrated, transistor Q3 584 is shown as a p-type MOSFET while transistor Q4 is exemplified as a n-type MOSFET. The emitter-terminal of transistor Q2 587 is shown as coupled to the gate-terminals of both transistors Q3 584 and Q4 585 (denoted as terminal 593). In addition, the source-terminal of transistor Q3 584 is coupled to current source 582 while the source-terminal of transistor Q4 585 is coupled to return 529. The respective drain-terminals of transistor Q3 584 and transistor Q4 585 are coupled to each other. Inverter 575 and capacitance 586 are shown as coupled to the drain-terminals of transistor Q3 584 and transistor Q4 585. The input of the inverter 575 is coupled to the gate-terminal of transistor Q1 583. As illustrated, the output of the inverter is the limit sense signal U$_{LS}$ 568 while the voltage across the capacitance 586 is the sense signal U$_{SENSE}$ 528.

In operation, if the power converter is not in a limit condition and the temperature is low, the resistance of the resistor R1 578 is small. As such, the voltage at terminal 592 is also small. The transistor Q2 587 is off and the voltage at terminal 593 is low. As such the transistor Q3 is on while the transistor Q4 is off. The capacitance 586 is then charged by current source 582 with current I$_E$. Eventually the voltage (sense signal U$_{SENSE}$ 528) across the capacitance 586 increases until the voltage is considered logic high and the limit sense signal U$_{LS}$ 568 is logic low. The transistor Q1 583 is on and the resistance R2 579 is shorted.

As temperature increases, the resistance of resistor R1 578 increases (resulting in the voltage at terminal 592 to increase) while the base-emitter voltage of transistor Q2 587 decreases. If the temperature increases enough, the transistor Q2 587 is turned on. The voltage at terminal 593 increases and the transistor Q3 turns off while the transistor Q4 turns on. Capacitance 586 then discharges through the transistor Q4 585 and the voltage across the capacitance 586 decreases. Eventually the voltage (sense signal $U_{SENSE}$ 528) across the capacitance 586 decreases until the voltage is considered logic low and the limit sense signal $U_{LS}$ 568 transitions to a logic high value. Transistor Q1 583 is turned off and the overall resistance increases. As such the voltage at terminal 592 increases further to ensure that the transistor Q2 587 is on.

FIG. 6 is a diagram illustrating an example of a switched mode power converter utilized in an example of a charging device 600 in accordance with teachings of the present invention. As shown in the depicted example, charging device 600 includes power converter, socket 614, controller 620, primary drive signal 622, feedback signal $U_{FB}$ 624, and sense signal $U_{SENSE}$ 628. It is appreciated that charging device 600 may be one example of charging device 104 illustrated in FIG. 1A, and that similarly named elements referenced below are coupled and function similar to as described above. As shown in the depicted example, charging device further includes an input capacitor 634, charging device 600 also includes an input return 635, a clamp circuit 636, an energy transfer element T1 638, a primary winding 640, a secondary winding, a power switch S1 644, an output capacitor C1 646, an output rectifier 648, output return 649, and a sense circuit 650. The socket 614 includes the output terminal VOUT, data terminal D+, data terminal D−, and return terminal RTN. Further illustrated in FIG. 6 are the input voltage $V_{IN}$ 633, output voltage $V_O$ 658, output current $I_O$ 660, output quantity $U_O$ 662, and secondary drive signal 690. Controller 620 is further illustrated as including the primary controller 688 and the secondary controller 687 with a communication link 689 between the controllers 687 and 688. As illustrated, the secondary controller 687 further includes the mode select circuit 654 and the limit sense circuit 652. However the mode select circuit 654 and the limit sense circuit 652 could be included in the primary controller 688.

The example power converter shown in FIG. 6 is similar to the power converter illustrated in FIG. 2, however, the output rectifier 648 is exemplified as a synchronous rectifier and the controller 620 may include the primary controller 688 and the secondary controller 687. It should also be appreciated that certain elements that were illustrated in FIG. 2 for explanation purposes have been omitted from FIG. 6 so as not to obscure the teachings of the present invention. Similarly named and numbered elements are coupled and function as described above.

As shown in the example depicted in FIG. 6, the synchronous rectifier 648 is coupled to the secondary winding 642 and the output capacitor 646. In the example shown, the synchronous rectifier 648 includes a switch (exemplified as a transistor) and a diode. In one example, the diode may be an externally connected Schottky diode. The synchronous rectifier 648 is coupled to receive the secondary drive signal 690 from the secondary controller 687. Primary controller 688 and the secondary controller 687 may be implemented as monolithic integrated circuits or may be implemented with discrete electrical components or a combination of discrete and integrated components. Primary controller 688, secondary controller 687, and switch S1 644 could form part of an integrated circuit that is manufactured as either a hybrid or monolithic integrated circuit. However it should be appreciated that both the primary controller 688 and the secondary controller 687 need not be included in a single controller package.

The primary controller 688 is coupled to output the drive signal 622 to control switching of the power switch S1 644. The secondary controller 687 is coupled to output the secondary drive signal 690 to control switching of the synchronous rectifier 648. Primary controller 688 and secondary controller 687 may communicate via a communication link 689. Similar to FIG. 2, the secondary controller 687 receives the feedback signal $U_{FB}$ 624 and the senses signal 628. In the example shown, the secondary controller 687 determines if the power converter is in a limit condition and varies the operating region of the controller. In addition, the secondary controller 687 determines whether the power switch S1 644 should be turned on during a given switching cycle period, or the duration of time that switch S1 644 should be turned on during a switching cycle period. The secondary controller 687 may send a command to the primary controller 688 via the communication link 689 to control power switch S1 644. The primary switch S1 644 and the synchronous rectifier 648 are generally not turned on at the same time.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
   a drive circuit coupled to receive a feedback signal representative of an output of the power converter, the drive circuit coupled generate a drive signal coupled to control switching of a power switch of the power converter to regulate the output of the power converter in response to the feedback signal; and
   a limit sense circuit coupled to receive a sense signal representative of a condition of the power converter, wherein the limit sense circuit is to output a limit sense signal in response to the sense signal to indicate a limit condition in the power converter, wherein the drive circuit is to operate in a first operation mode if the limit sense signal indicates a no limit condition, wherein the first operation mode includes a first operation region in which the drive circuit is coupled to regulate the output of the power converter with a regulated output voltage up to a first constant output current, wherein the drive circuit is coupled to operate in a second operation mode if the limit sense signal indicates the limit condition, wherein the second operation mode includes a second operation region in which the drive circuit is coupled to regulate the output of the power converter with the regulated output voltage up to a second constant current that is less than the first constant current,
   wherein the limit sense circuit is coupled to transition the limit sense signal from indicating the no limit condition to indicating the limit condition when the sense signal indicates that a temperature in the power converter reaches a first threshold temperature, and wherein the limit sense circuit is coupled to transition the limit sense signal from indicating the limit condition to indicating the no limit condition when the sense signal indicates the temperature in the power converter reaches a second threshold temperature, wherein the second threshold temperature is less than the first threshold temperature.

2. The controller of claim 1 further comprising a mode select circuit coupled between the limit sense circuit and the drive circuit, wherein the mode select circuit is coupled to output a mode signal in response to the limit sense signal to select the first operation mode or the second operation mode.

3. The controller of claim 1 wherein the sense signal is representative of at least one of a temperature in the power converter, a root mean square (RMS) current of a power switch of the power converter, an output voltage of the power converter, and an output current of the power converter.

4. The controller of claim 1 wherein the limit sense circuit comprises:
a temperature sensing element coupled to sense the temperature in the power converter; and
a hysteretic comparator coupled to the temperature sensing element to sense the temperature in the power converter, wherein the hysteretic comparator is coupled to transition the limit sense signal from indicating the no limit condition to indicating the limit condition when the temperature in the power converter reaches the first threshold temperature, and wherein the limit sense circuit is coupled to transition the limit sense signal from indicating the limit condition to indicating the no limit condition when the temperature in the power converter reaches the second threshold temperature.

5. The controller of claim 1 wherein the limit sense circuit comprises:
a temperature sensing element coupled to sense the temperature in the power converter;
a resistor coupled to the temperature sensing element;
a first transistor coupled temperature sensing element and coupled across the resistor;
a first current source coupled to the temperature sensing element to conduct a first current through the temperature sensing element;
a second transistor coupled to the temperature sensing element, wherein the second transistor is coupled to be turned on and off in response to the temperature sensing element; and
a capacitor coupled to be charged and discharged in response to the second transistor being turned on and off, wherein the limit sense signal is coupled to be responsive to a voltage across the capacitor, wherein the first transistor is coupled to be turned on and off in response to the voltage across the capacitor, wherein the first current is further conducted through the resistor when the first transistor is turned off, and wherein the first current is further conducted through the first transistor when the first transistor is turned on.

6. The controller of claim 5 wherein the second transistor is a second temperature sensing element coupled to sense the temperature in the power converter, wherein the second transistor is further coupled to be turned on and off in response to the second temperature sensing element.

7. The controller of claim 5 wherein the limit sense circuit further comprises a second current source coupled to charge the capacitor through a third transistor in response to the second transistor being turned off, and a fourth transistor coupled to the discharge the capacitor in response to the second transistor being turned on.

8. The controller of claim 5 further comprising an inverter coupled to the capacitor to output the limit sense signal in response to the voltage across the capacitor.

9. The controller of claim 1 wherein the drive circuit is further coupled to receive a current sense signal representative of a switch current of the power switch, wherein the drive circuit is further coupled to generate the drive signal in response to the current sense signal.

10. The controller of claim 1 wherein the first constant current is substantially equal to a maximum rated current of the power converter.

11. The controller of claim 1, wherein the power converter is included in a charging device.

12. A power converter, comprising:
an energy transfer element coupled between an input of the power converter and an output of the power converter;
a power switch coupled to the energy transfer element and the input of the power converter;
a sense circuit coupled to output a feedback signal representative of an output of the power converter; and
a controller including:
a drive circuit coupled to receive the feedback signal, wherein the drive circuit is coupled generate a drive signal coupled to control switching of the power switch to regulate the output of the power converter in response to the feedback signal; and
a limit sense circuit coupled to receive a sense signal representative of a condition of the power converter, wherein the limit sense circuit is to output a limit sense signal in response to the sense signal to indicate a limit condition in the power converter, wherein the drive circuit is to operate in a first operation mode if the limit sense signal indicates a no limit condition, wherein the first operation mode operates in a first operation region in which the drive circuit is coupled to regulate the output of the power converter with a regulated output voltage and up to a first maximum output current, wherein the drive circuit is coupled to operate in a second operation mode if the limit sense signal indicates the limit condition, wherein the second operation mode includes a second operation region in which the drive circuit is coupled to regulate the output of the power converter to the regulated output voltage and up to a second maximum output current, wherein the second maximum output current is less than the first maximum output current,
wherein the limit sense circuit is coupled to transition the limit sense signal from indicating the no limit condition to indicating the limit condition when the sense signal indicates that a temperature in the power converter reaches a first threshold temperature, and wherein the limit sense circuit is coupled to transition the limit sense signal from indicating the limit condition to indicating the no limit condition when the sense signal indicates the temperature in the power converter reaches a second threshold temperature, wherein the second threshold temperature is less than the first threshold temperature.

13. The power converter of claim 12 further comprising an output rectifier coupled to the energy transfer element and the output of the power converter.

14. The power converter of claim 13 wherein the output rectifier is a diode coupled to the energy transfer element and the output of a charging device.

15. The power converter of claim 13 wherein the output rectifier is a synchronous rectifier coupled to receive a secondary drive signal from the controller.

16. The power converter of claim 12 wherein the sense signal is representative of at least one of a temperature in the power converter, a root mean square (RMS) current of the power converter, an output voltage of the power converter, and an output current of the power converter.

17. The power converter of claim 12 wherein the limit sense circuit comprises:
a temperature sensing element coupled to sense the temperature in the power converter; and
a hysteretic comparator coupled to the temperature sensing element to sense the temperature in the power converter, wherein the hysteretic comparator is coupled to transition the limit sense signal from indicating the no limit condition to indicating the limit condition when the temperature in the power converter reaches the first threshold temperature, and wherein the limit sense circuit is coupled to transition the limit sense signal from indicating the limit condition to indicating the no limit condition when the temperature in the power converter reaches the second threshold temperature.

18. The power converter of claim 12 wherein the limit sense circuit comprises:
a temperature sensing element coupled to sense the temperature in the power converter;
a resistor coupled to the temperature sensing element;
a first transistor coupled temperature sensing element and coupled across the resistor;
a first current source coupled to the temperature sensing element to conduct a first current through the temperature sensing element;
a second transistor coupled to the temperature sensing element, wherein the second transistor is coupled to be turned on and off in response to the temperature sensing element; and
a capacitor coupled to be charged and discharged in response to the second transistor being turned on and off, wherein the limit sense signal is coupled to be responsive to a voltage across the capacitor, wherein the first transistor is coupled to be turned on and off in response to the voltage across the capacitor, wherein the first current is further conducted through the resistor when the first transistor is turned off, and wherein the first current is further conducted through the first transistor when the first transistor is turned on.

19. The power converter of claim 18 wherein the second transistor is a second temperature sensing element coupled to sense the temperature in the power converter, wherein the second transistor is further coupled to be turned on and off in response to the second temperature sensing element.

20. The power converter of claim 18 wherein the limit sense circuit further comprises a second current source coupled to charge the capacitor through a third transistor in response to the second transistor being turned off, and a fourth transistor coupled to the discharge the capacitor in response to the second transistor being turned on.

21. The power converter of claim 18 further comprising an inverter coupled to the capacitor to output the limit sense signal in response to the voltage across the capacitor.

22. The power converter of claim 12 further comprising a socket coupled to the output of the power converter, wherein a powered device is to be coupled to be charged by the power converter through the socket.

23. The power converter of claim 12 wherein a constant current is substantially equal to a maximum rated current of the power converter.

* * * * *